Patented Nov. 27, 1951

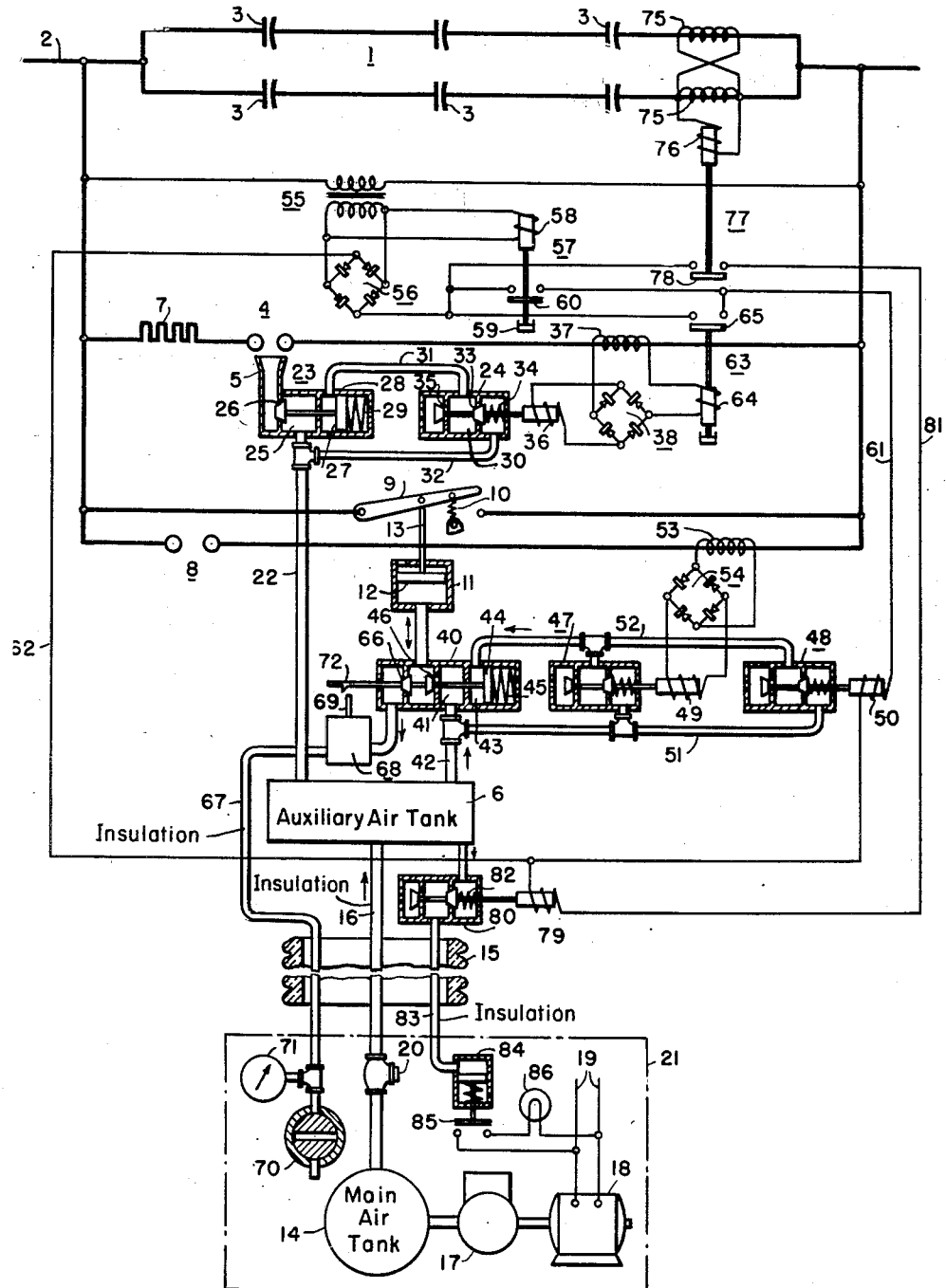

2,576,132

UNITED STATES PATENT OFFICE 2,576,132

PROTECTIVE SYSTEM FOR SERIES CAPACITORS

Ralph E. Marbury, Wilkinsburg, Pa., assignor to Westinghouse Electric Corporation, East Pittsburgh, Pa., a corporation of Pennsylvania Application February 25, 1950, Serial No. 146,299

27 Claims. (Cl. 175—294)

The present invention relates to series capacitor installations in alternating-current lines and, more particularly, to a protective system for series capacitors in high-voltage, synchronous, alternating-current transmission lines where system stability is a primary or limiting consideration in the operation of the line.

Capacitors are connected in series in alternating-current transmission or distribution lines to neutralize part, or all, of the inductive reactance of the line, in order to raise the stability limit, or the power limit, of a transmission line, or to improve the voltage regulation of a distribution line. Since such capacitors are connected directly in series in the line and carry the line current, the voltage across the capacitor is proportional to the line current, and in case of a fault on the line, the voltage across the capacitor may rise to many times its normal value. Standard capacitor units, such as are used in series capacitor installations, are capable of withstanding overvoltages of the order of 150% of their normal rated voltage for brief periods, or somewhat higher voltages momentarily, but they cannot be subjected to voltages in excess of about 250% to 300% of normal voltage, even momentarily, without the probability of damage.

It is not practical to utilize capacitors which are capable of withstanding the maximum voltage to which they may be subjected under fault conditions, because of the excessive cost, since the cost of a capacitor increases approximately as the square of the voltage for which it is designed. A series capacitor installation, therefore, usually consists of capacitor units having a voltage rating determined on the basis of the normal voltage across the capacitor, together with a protective system for by-passing the capacitor under fault conditions, or other excess-current conditions, in order to protect the capacitor against overvoltage. In order to adequately protect the capacitor, the protective system must operate to by-pass it substantially instantaneously upon the occurrence of an overvoltage of predetermined magnitude, that is, the capacitor must be effectively by-passed within the first half-cycle of fault current. Because of this requirement of substantially instantaneous operation, spark gaps are usually used in these protective systems, since no switch, or other device involving moving parts or mechanical movement, could operate fast enough.

In the protective systems which have usually been used in connection with series capacitors in distribution lines, a spark gap is connected across the capacitor to break down and by-pass it immediately upon the occurrence of a predetermined overvoltage, and a switch or contactor is provided for by-passing both the gap and the capacitor immediately after the gap has broken down, in order to extinguish the arc in the gap and to relieve the gap from the excessive heating caused by continued arcing. The switch is opened to interrupt the by-pass circuit and restore the capacitor to service after the line current has fallen to its normal value, or after the lapse of a predetermined time interval which is made long enough to allow the protective devices of the line to clear the fault. This type of protective system is entirely satisfactory for series capacitors installed in distribution lines, where the primary purpose of the capacitor is to improve the voltage regulation of the line, and the short delay in restoring the capacitor to service after a fault has been cleared is of no particular importance.

When a series capacitor is installed in a high-voltage transmission line, however, where system stability is an important or limiting consideration in the operation of the line, and where the series capacitor is installed for the primary purpose of raising the stability limit, so as to increase the amount of power that can be transmitted over the line, the problem of protection is much more difficult, and the type of protective system which has been successfully utilized in connection with series capacitors in distribution lines is not satisfactory. The capacitor must be protected substantially instantaneously upon the occurrence of a predetermined overvoltage, as explained above, but if it is completely by-passed, the capacitor is effectively removed from service during fault conditions when the stability problem is most acute. For this reason, the protective system must operate to restore the capacitor to full effectiveness immediately after the fault has been cleared, so that it will be available to assist in maintaining stability during the critical transient conditions immediately following clearing of the fault.

In previous attempts to provide a satisfactory protective system for series capacitors in high-voltage transmission lines, the capacitor has been by-passed during a fault by means of a spark gap, and various arrangements have been proposed for interrupting the by-pass circuit as rapidly as possible following the return of the line current to, or near, normal value. Even with specially designed fast-operating relays and switches, however, such a system necessarily involves an appreciable delay, of at least several cycles, after a fault has been cleared before the capacitor is restored to service. Thus, with these prior protective systems, the capacitor has been completely removed from service during a fault and during at least a part of the critical period immediately following clearing of the fault, so that the series capacitor, which is installed primarily for the purpose for improving stability conditions and increasing the amount of power which can be transmitted over the line, is completely removed from service and is not available for its intended purpose during the time when it is most needed. This difficulty in providing adequate protection for series capacitors, without at the same time rendering them ineffective when their presence is most needed, has been a major factor in retarding or preventing the use of series capacitors in high-voltage transmission lines, although the advantages of series capacitors in such lines have long been recognized.

In my prior copending application, Serial No. 110,947, filed August 18, 1949, and assigned to Westinghouse Electric Corporation, there is disclosed and claimed a protective system for series capacitors which avoids the difficulty described above, and which restores the capacitor to full effectiveness within the first half-cycle after a fault is cleared. In this system, the series capacitor is by-passed by a spark gap device, which is made self-clearing by means of an air blast directed through the gap to deionize the gap space between the electrodes and thus extinguish the arc. This air blast is started as soon as the gap has broken down, so that the arc is extinguished at each current zero and restrikes on the following half-cycle when the voltage rises to a value which is near the initial breakdown voltage. If the voltage does not rise to this value in any half-cycle, the arc fails to restrike, and the by-pass circuit is thus interrupted, and the capacitor restored to full effectiveness, within the first half-cycle after the fault is cleared.

The principal object of the present invention is to provide an improved protective system of this type for series capacitors which has additional protective means for by-passing the capacitor in response to the occurrence of certain abnormal conditions, including failure of the main gap device to operate, continued arcing of the main gap for more than a predetermined time, and the occurrence of a sustained overvoltage across the series capacitor which is lower than the breakdown voltage of the main gap but high enough to be damaging to the capacitor if it continues for a period of time.

Another object of the invention is to provide an electropneumatic protective system for series capacitors in which the capacitor is by-passed by a main spark gap device which is made self-clearing by means of an air blast, and in which a by-pass switch is provided which is biased to closed position, but which is normally held in the open position by means of air pressure, which is released to allow the switch to close in response to the occurrence of certain predetermined abnormal conditions.

A further object of the invention is to provide a protective system for series capacitors in which a main self-clearing spark gap device is provided to by-pass the capacitor under fault, or other excess-current, conditions, and in which a second gap device having a higher breakdown voltage is also connected across the capacitor to provide backup protection in case of failure of the main gap to operate, together with means for effecting closing of a by-pass switch in response to operation of the backup gap device, or the occurrence of certain other abnormal conditions.

More specifically, the invention provides an electropneumatic protective system for series capacitors in which the capacitor is protected against overvoltages by a main spark gap device, which is connected across the capacitor and which is made self-clearing by a blast of air from a compressed air tank mounted adjacent the gap and insulated from ground. A backup spark gap device, having a higher breakdown voltage, and a by-pass switch are also connected across the capacitor. The by-pass switch is biased to closed position but is normally held in the open position by air pressure from the air tank, and means are provided for releasing the air pressure to allow the switch to close in response to the occurrence of certain abnormal conditions, including operation of the backup gap, continued arcing of the main gap for more than a predetermined time, and the occurrence of a sustained overvoltage across the capacitor of a lower magnitude than the breakdown voltage of the main gap. Means are also provided for giving a remote warning or indication of failure of one or more individual capacitor units, and remote manual means at ground potential are provided for effecting reapplication of air pressure to the by-pass switch, after an operation, to reopen the switch.

The invention will be more fully understood from the following detailed description of a preferred embodiment, taken in connection with the accompanying drawing, the single figure of which is a schematic diagram of a series capacitor installation embodying the invention.

The drawing shows a protective system for a series capacitor 1 installed in an alternating-current line 2. The line 2 represents one phase of a high-voltage, three-phase, synchronous transmission line in which the series capacitor 1 is installed for the purpose of raising the stability limit of the system and thus increasing the amount of power that can be transmitted over the line. It will be understood that similar equipment is provided in each of the other two phases, which have not been shown, in order to avoid unnecessary complication of the drawing. The series capacitor 1 consists of a suitable number of individual capacitor units 3, connected together in any suitable series or series-parallel arrangement to give the desired capacitive reactance and current capacity. The individual capacitor units 3 are thus connected in a bank which is connected in series in the line 2, and in the preferred embodiment, the series capacitor bank is divided into two equal parallel branches, for a purpose described hereinafter. The terms "series capacitor" or "capacitor," as used herein, are to be understood as including any necessary number of individual capacitor units, and the capacitor units 3 shown in the drawing are representative of any necessary number of individual capacitor units, a relatively large number of parallel-connected units normally being used.

The series capacitor 1 is protected against over-voltages resulting from faults, or other excess-current conditions, on the line 2 by means of a main spark gap device 4 connected across the capacitor 1. The spark gap device 4 may have massive carbon electrodes, so as to be capable of sustaining continued arcing without damage, and is preferably of the type disclosed and claimed in the copending application mentioned above, although any suitable construction might be used. The gap device 4 is made self-clearing by means of an air blast directed into the gap through a nozzle 5 from a compressed air tank 6. A resistor 7 is preferably connected in series with the main gap 4 across the capacitor 1. The resistor 7 may be primarily a damping resistor to damp the capacitor discharge in order to avoid damage to the capacitor by repeated charging and discharging as the gap 4 operates and also to limit the inrush current from the capacitor when the gap breaks down, and prevent excessive transient currents. If desired, however, the resistor 7 might have a higher value and be designed primarily to limit the voltage across the capacitor 1, so that the capacitor is not completely by-passed when the gap 4 breaks down, but is at least partially effective even during the existence of a fault, as more fully explained in the above-mentioned copending application.

A backup spark gap device 8 is also provided and is connected in parallel with the main gap device 4. The backup gap 8 may be of the same general type as the main gap 4 and is intended to operate to protect the capacitor 1 if the main gap 4 fails to operate for any reason. The backup gap 8 is, therefore, set to have a somewhat higher breakdown voltage than the main gap, so that it operates only if the main gap does not. Thus, the main gap 4 may be set for a breakdown voltage equal to about 250% of the normal voltage across the series capacitor 1, which is the maximum voltage that should be permitted to occur across the capacitor, while the backup gap 8 may be set for a breakdown voltage of about 300% of the normal voltage, so that it will operate to protect the capacitor if the main gap 4 fails to operate.

A by-pass switch 9 is also connected across the series capacitor 1, in parallel with the spark gap devices 4 and 8, for by-passing the capacitor upon the occurrence of certain abnormal conditions. The by-pass switch 9 is biased toward closed position by means of a spring 10, and is provided with a pneumatic cylinder 11 containing a piston 12 which is connected to the switch 9 by a link 13, or in any other suitable manner. The by-pass switch 9 is thus biased to closed position, but is normally held in the open position by means of air pressure admitted to the cylinder 11 from the air tank 6. The air pressure in the cylinder 11 is released in response to the occurrence of certain predetermined abnormal conditions to allow the switch 9 to close and by-pass the capacitor.

The electropneumatic system for controlling the air blast through the main gap 4, and for effecting operation of the by-pass switch 9, includes a main compressed air tank 14 and the auxiliary compressed air tank 6 mentioned above. The gap devices 4 and 8 and the by-pass switch 9, and their associated equipment, must, of course, be insulated from ground for the full line voltage, and since the line voltage may be quite high, of the order of 220 kv. for example, in the type of transmission system for which the invention is particularly intended, this means that the gap devices and switch are necessarily spaced a considerable distance from any apparatus at ground potential. The air supply from which the air blast is obtained must be closely adjacent the gap, however, in order to avoid the delay incident to bringing the air from a relatively distant tank at ground potential, and must be adequate to maintain the air blast as long as the gap 4 continues to arc. For this purpose, the auxiliary air tank 6 is utilized, and is mounted closely adjacent the gap 4 and insulated from ground, preferably by mounting the tank on top of a column of hollow insulators 15 through which an insulating conduit 16 extends to the main air tank 14, which is at ground potential. The physical structure and arrangement of the insulator column 15 and the auxiliary air tank 6 are preferably as shown and claimed in the copending application referred to above, except that three air lines or conduits are carried in the insulator column, as described hereinafter.

The main air tank 14 is supplied with air by means of a compressor 17 driven by a motor 18 supplied from any suitable power source 19. The compressor 17 and motor 18 are controlled automatically in any desired manner to maintain a desired air pressure, such as 250 pounds per square inch, in the main tank 14, and the main tank 14 is connected directly to the auxiliary tank 6 by means of the conduit 16, through a check valve 20. The pressure in the auxiliary tank is preferably maintained at a somewhat lower value, such as 150 pounds per square inch, by means of a suitable pressure regulator, or other means. With this arrangement, an adequate source of compressed air for the air blast and for the switch 9 is placed closely adjacent these devices and insulated from ground, but the main air tank with its compressor and driving motor can be located at any suitable or convenient point and need not be insulated from ground. The main air tank 14 and compressor 17 are preferably placed in a housing, indicated at 21, at any convenient location.

The air blast is supplied to the main gap 4 from the auxiliary air tank 6 through a conduit 22, and the blast is controlled by a blast valve 23 which, in turn, is controlled by a pilot valve 24. The blast valve 23 includes a valve chamber 25 connected with the nozzle 5 by a normally closed port 26. The valve is actuated by a piston 27 in a cylinder 28, and is biased to closed position by a spring 29. The cylinder 28 is connected to the valve chamber 30 of the pilot valve 24, by means of a conduit 31. The pilot valve 24 receives air from the tank 6 through a conduit 32 and is normally held in closed position, by a spring 34, to close the port 33 between the valve chamber 30 and the conduit 32. A normally open exhaust port 35 is also provided. The pilot valve 24 is actuated by means of solenoid 36 which, when energized, causes the valve to open the port 33 and close the exhaust port 35, thus admitting air from the conduit 32 to the cylinder 28 of the blast valve 23 to open the blast valve. The air blast is initiated in response to current flow through the main gap device 4 by means of a current transformer 37 energized by current in the gap circuit. The transformer 37 is connected to a rectifier bridge 38, and the direct-current output of the rectifier bridge 38 is connected directly to the solenoid 36, so that the pilot valve 24 is actuated immediately upon breakdown of the main gap 4.

The by-pass switch 9 is controlled by means of a main valve 40. The valve 40 has a valve chamber 41 which is connected to the air tank 6 by means of a conduit 42. The valve 40 has a cylinder 43 containing a piston 44 which is biased by a spring 45 to normally hold the valve open to admit air through the port 46 to the cylinder 11. Thus, the switch 9 is normally held in open position by air pressure in the cylinder 11.

The main valve 40 is controlled by either one of two pilot valves 47 and 48. The valves 47 and 48 are of identical construction and are similar to the pilot valve 24 described above. The valve 47 is actuated by a solenoid 49 and the valve 48 by a solenoid 50. The pilot valves 47 and 48 are connected to the air tank 6 by a conduit 51, and when actuated, they admit air from the tank 6 to the cylinder 43 of the main valve 40 through a conduit 52, causing the valve 40 to close its port 46 and release the air pressure in the cylinder 11, so that the by-pass switch 9 is closed by the spring 10.

The pilot valve 47 is actuated in response to operation of the backup gap device 8, by means of a current transformer 53 energized by current flowing through the backup gap. The current transformer 53 is connected to a rectifier bridge 54 and the direct-current output of the rectifier bridge is connected directly to the solenoid 49. Thus, when the gap 8 operates, the solenoid 49 is immediately energized and actuates the pilot valve 47 to effect operation of the valve 40 to release the air pressure in the cylinder 11 and allow the by-pass switch 9 to close.

The pilot valve 48 is actuated in response to the occurrence of a sustained overvoltage of relatively low magnitude across the series capacitor 1, and also in response to continued arcing of the main gap 4 for an excessively long period. For this purpose, a potential transformer 55 is connected across the capacitor 1. The secondary of the potential transformer 55 is connected to a rectifier bridge 56 which supplies direct-current energy for energizing the solenoid 50. A time-delay relay 57 has its operating coil 58 connected across the secondary of the potential transformer 55, so as to be responsive to the voltage across the series capacitor 1. The relay 57 has time-delay characteristics, as indicated diagrammatically by the dashpot 59, and is adapted to close its contact 60 when the pickup voltage of the relay has been exceeded for a predetermined length of time. It will be understood that the capacitor 1 is capable of withstanding moderate overvoltages for reasonable lengths of time, but it may be damaged if such an overvoltage persists for too long a period. The relay 57, therefore, is intended to operate to protect the capacitor against overvoltages which are lower than the breakdown voltage of the main gap 4, but which cannot be permitted to persist indefinitely without damaging the capacitor. For example, the relay 57 may be set to respond to a voltage of 110% of normal, with a suitable time delay to avoid by-passing the capacitor unless it is necessary. The relay 57 preferably has inverse time characteristics, so as to operate more rapidly on higher overvoltages. The contact 60 of the relay 57 is connected to energize the solenoid 50 of the pilot valve 48 from the rectifier bridge 56 through the conductors 61 and 62.

The main gap device 4 is designed to be capable of withstanding more or less continuous arcing for a reasonable time, but if a fault on the line 2 is not cleared within the expected time, for any reason, and the gap 4 continues arcing for longer than the time it is designed for, it may be damaged. In order to provide protection against this possibility, a second time-delay relay 63 is provided. The coil 64 of the relay 63 is connected in series with the current transformer 37 so as to be energized in response to current flow through the main gap device 4. The relay 63 is adjusted to close its contact 65 if current continues to flow through the gap 4 after a predetermined time, which may, for example, be of the order of fifteen cycles or more, or in general, a longer time than is normally required for the protective devices of the line 2 to clear a fault. The contact 65 of the relay 63 is connected in parallel with the contact 60 of the relay 57, so that when the contact 65 closes, the solenoid 50 of the pilot valve 48 is energized. Thus, the pilot valve 48 is actuated in response to either a sustained moderate over-voltage across the series capacitor, or to continued arcing of the main gap 4 beyond the predetermined time, and in either case the pilot valve 48 effects operation of the main valve 40 to permit the by-pass switch 9 to close.

When the main valve 40 is operated by actuation of either of the pilot valves 47 or 48, the port 46 is closed and cuts off the air pressure from the cylinder 11. At the same time, an exhaust port 66 is opened to allow the air in the cylinder 11 to exhaust into an insulating conduit 67. In escaping from the valve 40 to the conduit 67, the air exhausted from the cylinder 11 passes through a locking device 68. The locking device 68 may be of any suitable type, and is adapted to raise a latch 69 when actuated by the pressure of the air escaping from the cylinder 11. The insulating conduit 67 extends through the insulator column 15 to ground level and terminates in a manually operated valve 70, which is normally in the closed position, as indicated in the drawing. A pressure gauge 71 is provided adjacent the valve 70 to indicate the pressure in the conduit 67.

When the valve 40 operates, the air in the cylinder 11 is exhausted through the port 66 and flows through the locking device 68 into the conduit 67. Since the valve 70 is normally closed, the air cannot escape and sufficient pressure is built up in the locking device 68 to actuate the latch 69, which engages the stem 72 of the valve 40 to lock the valve 40 in its actuated position. As soon as the switch 9 has closed, the electrical impulse which energized the solenoid 49 or 50 terminates, and the pilot valve involved returns to its normal position, cutting off the air from the cylinder 43 of the valve 40. The valve 40 is locked in its actuated position, however, by the latch 69, and the by-pass switch 9 remains closed. When it is desired to reopen the by-pass switch, it is only necessary to open the manually operated valve 70, which permits the air trapped in the locking device 68 and conduit 67 to escape, and the latch 69 is retracted and releases the valve 40, so that it is returned to its normal position by the spring 45 and readmits air to the cylinder 11 to reopen the by-pass switch 9. It will be apparent that the locking device 68 may be any suitable type of device which will lock the valve 40 in its actuated position when the locking device is actuated by air pressure exhausted from the cylinder 11.

It may sometimes occur that one or more of the individual capacitor units making up the series capacitor bank 1 will fail, and the capacitor units are provided with individual fuses which will blow and remove a faulted unit from the circuit. There is usually a relatively large number of individual capacitor units in a series capacitor bank of the type here involved, so that removal of one or several units from the circuit does not sufficiently change the characteristics of the bank to require immediately removing it from service. It is desirable, however, to know of the presence of a faulted unit, or of a blown fuse, so that the unit can be replaced at a convenient time. The system of the present invention, therefore, includes means for providing a remote indication of the operation of one or more individual capacitor fuses. For this purpose, the series capacitor bank 1 is divided into two equal parallel branches, as shown in the drawing, and a current transformer 75 is connected in each branch. The current transformers 75 are cross-connected, as shown, to the coil 76 of a relay 77. Since the two parallel branches of the bank 1 are equal, the currents in them will normally be equal, and there will be no resultant current in the coil 76. If one or more capacitor units should fail, in either branch of the bank, and be disconnected from the bank by operation of the individual fuses, the impedance of that branch will be changed, and the current will no longer divide equally between the two branches. This unbalance in the currents in the two parallel branches causes a resultant current in the coil 76 and the relay 77 closes its contact 78.

The contact 78 of the relay 77 is connected to energize the solenoid 79 of a valve 80 from the rectifier bridge 56 through the conductors 81 and 62. The valve 80 is normally held in closed position by a spring 82, and when opened by energization of the solenoid 79, admits air from the tank 6 to an insulating conduit 83, which extends through the insulator column 15 to ground level and is connected to a pressure-responsive switch 84. The pressure-responsive switch 84 may be mounted at any suitable remote location and may be at ground potential. The switch 84 has a contact 85, which is closed when pressure is applied to the switch, and which connects a signal or indicating device 86 across the line 19 when the contact is closed. Thus, failure of one or more capacitor units causes the valve 80 to open and admit air to the switch 84 to cause energization of the signal device 86. The signal device 86 is shown as a lamp, but it is apparent that any suitable type of signal or indicating device, either visual or audible, might be used.

The operation of the complete system may be summarized as follows. Under normal conditions, the parts are in the positions shown in the drawing, with the by-pass switch 9 held open by air pressure in the cylinder 11. If a fault, or other excess-current condition, occurs on the line 2, the voltage across the series capacitor 1 rises, and when it reaches the predetermined maximum permissible value for which the main gap device 4 is set, the main gap will break down and become conducting to by-pass and protect the capacitor 1. As soon as the gap 4 breaks down and current starts to flow through the gap circuit, the solenoid 36 is energized, through the current transformer 37 and rectifier bridge 38, and actuates the pilot valve 24 to admit air from the air tank 6, through the conduits 22, 32, and 31, to the cylinder 28 of the blast valve 23. This opens the blast valve 23 to admit air directly from the conduit 22 to the nozzle 5, and a blast of air is directed through the main gap 4. Since the tank 6 is located close to the gap, the air blast is started with a delay of not more than 1½ or 2 cycles after the gap 4 breaks down. The air blast deionizes the arc path, and the arc in the gap device 4 is thus extinguished at each current zero, and restrikes on the succeeding half-cycle when the voltage rises to a value near the original breakdown voltage. As soon as the fault is cleared, or the excess-current condition has passed, the voltage across the series capacitor drops, and the arc in the gap 4 will fail to restrike on the first half-cycle after the fault is cleared. The capacitor is, therefore, restored to service and is available immediately after the fault to assist in maintaining stability during the critical transient conditions following clearing of the fault. As soon as current ceases to flow in the gap circuit, the solenoid 36 is deenergized and the pilot valve 24 and blast valve 23 return to their normal positions, cutting off the blast. A slight time delay may be introduced, if desired, to insure that the arc is extinguished before the blast is stopped.

If, for any reason, the main gap device 4 should fail to break down and become conducting under excess-current conditions, the backup gap device 8 will break down down and by-pass the capacitor as soon as the voltage across the capacitor has reached the somewhat higher value for which the backup gap is set. As soon as the gap 8 has broken down, the solenoid 49 of the pilot valve 47 is energized from the current transformer 53 and rectifier bridge 54, and actuates the pilot valve 47 to effect operation of the main valve 40 to release the air pressure in the cylinder 11, permitting the by-pass switch 9 to close and by-pass the capacitor. The air exhausting from the cylinder 11 actuates the locking device 68 to lock the valve 40 in actuated position, as previously explained, so that the by-pass switch 9 remains closed, although the solenoid 49 is deenergized as soon as the switch closes, since the gap 8 is then short-circuited and the arc in it is extinguished. The pressure gauge 71 registers the pressure in the conduit 67 and locking device 68 and thus provides a remote indication of the operation of the switch 9.

If the main gap device 4 operates normally, but continues to arc, either because the fault is not cleared within the expected time, or because the air blast does not extinguish the arc, or for any other reason, the time-delay relay 63 closes its contact 65, after arcing has continued beyond a predetermined time, and thus energizes the solenoid 50 of the pilot valve 48. This causes the pilot valve 48 to effect operation of the main valve 40, in the same manner as before, to permit the by-pass switch 9 to close to by-pass and protect the capacitor, and to short-circuit the gap 4 and extinguish the arc.

Similarly, if a moderate overvoltage, which is too low to cause operation of the gap 4, occurs across the series capacitor 1, and persists for a long enough time to endanger the capacitor, the time-delay relay 57 closes its contact 60 to energize the solenoid 50 of the pilot valve 48 to effect operation of the valve 40 and closing of the by-pass switch 9 to protect the capacitor. When the switch 9 has been closed, by operation of either of the pilot valves 47 or 48, it remains closed since the valve 40 is locked in its actuated position by the locking device 68. The switch 9 is reopened by opening the manual valve 70, and then reclosing the valve to prepare for a subsequent operation. The valve 70 can be placed at any convenient remote location and can safely be operated manually since it is at ground potential.

It should now be apparent that an electropneumatic protective system has been provided for series capacitors which effectively protects the capacitor against over-voltage, and which also provides for by-passing the capacitor in response to the occurrence of certain abnormal conditions. The system also includes means for providing a remote indication of failure or one or more individual capacitor units, so that faulted units can be replaced. The pneumatic system includes a main air tank at ground potential, which may be placed in any suitable location and which supplies air to an auxiliary tank close to the gap and switch and insulated from ground, so that an adequate air supply is provided close to the high-voltage equipment. It will be noted that in case of failure of the air pressure, for any reason, or if the air pressure becomes abnormally low, the by-pass switch 9 will be closed by the spring 10, so that the series capacitor is by-passed and protected until the trouble is remedied and the air pressure restored. The manual valve 70, the pressure gauge 71, and the pressure switch 84, with the signal device 86, for all three phases of a three-phase installation may conveniently be mounted together in the housing 21 which also houses the main air tank and compressor. A common main air tank 14 may be used for all three phases, with individual auxiliary air tanks 6 mounted on individual insulator columns 15 for each phase.

A preferred embodiment of the invention has been shown and described for the purpose of illustration, but it will be apparent that various other modifications and embodiments are possible within the scope of the invention. Thus, any one of the several protective features described might be omitted, if it is not needed in a particular installation, and other obvious modifications may be made. It is to be understood, therefore, that the invention is not limited to the particular arrangement and details of construction described, but in its broadest aspect, it includes all equivalent embodiments and modifications which come within the scope of the appended claims.

I claim as my invention:

1. A series capacitor installation for an alternating-current line comprising a capacitor adapted to be connected in series in said line, a main spark gap device connected across said capacitor and adapted to break down and become conducting whenever the instantaneous voltage across the capacitor exceeds a predetermined value, a by-pass switch connected across the capacitor and main gap device, spring means biasing the by-pass switch to closed position, and electropneumatic means for normally holding the by-pass switch in open position and for allowing the switch to close upon the occurrence of a predetermined abnormal condition.

2. A series capacitor installation for an alternating-current line comprising a capacitor adapted to be connected in series in said line, a main spark gap device connected across said capacitor and adapted to break down and become conducting whenever the instantaneous voltage across the capacitor exceeds a predetermined value, a by-pass switch connected across the capacitor and main gap device, spring means biasing the by-pass switch to closed position, means for applying air pressure to the by-pass switch to normally hold the switch in open position, and electrically actuated means for releasing the air pressure to allow the switch to close upon the occurrence of a predetermined abnormal condition.

3. A series capacitor installation for an alternating-current line comprising a capacitor adapted to be connected in series in said line, a main spark gap device connected across said capacitor and adapted to break down and become conducting whenever the instantaneous voltage across the capacitor exceeds a predetermined value, a by-pass switch connected across the capacitor and main gap device, spring means biasing the by-pass switch to closed position, means for applying air pressure to the by-pass switch to normally hold the switch in open position, electrically actuated means for releasing the air pressure to allow the switch to close upon the occurrence of a predetermined abnormal condition, and remote manual means for effecting reapplication of air pressure to reopen the by-pass switch.

4. A series capacitor installation for an alternating-current line comprising a capacitor adapted to be connected in series in said line, a main spark gap device connected across said capacitor and adapted to break down and become conducting whenever the instantaneous voltage across the capacitor exceeds a predetermined value, a compressed air tank, means for directing a blast of air from said air tank through said main gap device as soon as it has broken down, a by-pass switch connected across the capacitor and main gap device, spring means biasing the by-pass switch to closed position, means for applying air pressure from the air tank to the by-pass switch to normally hold the switch in open position, and electrically actuated means for releasing the air pressure to allow the switch to close upon the occurrence of a predetermined abnormal condition.

5. A series capacitor installation for an alternating-current line comprising a capacitor adapted to be connected in series in said line, a main spark gap device connected across said capacitor and adapted to break down and become conducting whenever the instantaneous voltage across the capacitor exceeds a predetermined value, a compressed air tank, means for directing a blast of air from said air tank through said main gap device as soon as it has broken down, a by-pass switch connected across the capacitor and main gap device, spring means biasing the by-pass switch to closed position, means for applying air pressure from the air tank to the by-pass switch to normally hold the switch in open position, electrically actuated means for releasing the air pressure to allow the switch to close upon the occurrence of a predetermined abnormal condition, and remote manual means for effecting reapplication of air pressure to reopen the by-pass switch.

6. A series capacitor installation for an alternating-current line comprising a capacitor adapted to be connected in series in said line, a main spark gap device connected across said capacitor and adapted to break down and become conducting whenever the instantaneous voltage across the capacitor exceeds a predetermined value, a compressed air tank, means for directing a blast of air from said air tank through said main gap device as soon as it has broken down, a by-pass switch connected across the capacitor and main gap device, spring means biasing the by-pass switch to closed position, a pneumatic cylinder connected to the by-pass switch, valve means for admitting air from the air tank to said cylinders to normally hold the by-pass switch in open position, and electric means responsive to a predetermined abnormal condition for effecting actuation of said valve means to exhaust air from the cylinder to allow the by-pass switch to close.

7. A series capacitor installation for an alternating-current line comprising a capacitor adapted to be connected in series in said line, a main spark gap device connected across said capacitor and adapted to break down and become conducting whenever the instantaneous voltage across the capacitor exceeds a predetermined value, a compressed air tank, means for directing a blast of air from said air tank through said main gap device as soon as it has broken down, a by-pass switch connected across the capacitor and main gap device, spring means biasing the by-pass switch to closed position, a pneumatic cylinder connected to the by-pass switch, valve means for admitting air from the air tank to said cylinder to normally hold the by-pass switch in open position, electric means responsive to a predetermined abnormal condition for effecting actuation of said valve means to exhaust air from the cylinder to allow the by-pass switch to close, and remote manual means for effecting operation of the valve means to readmit air to the cylinder to reopen the by-pass switch.

8. A series capacitor installation for an alternating-current line comprising a capacitor adapted to be connected in series in said line, a main spark gap device connected across said capacitor and adapted to break down and become conducting whenever the instantaneous voltage across the capacitor exceeds a predetermined value, a compressed air tank, means for directing a blast of air from said air tank through said main gap device as soon as it has broken down, a by-pass switch connected across the capacitor and main gap device, spring means biasing the by-pass switch to closed position, a pneumatic cylinder connected to the by-pass switch, valve means for admitting air from the air tank to said cylinder to normally hold the by-pass switch in open position, electric means responsive to a predetermined abnormal condition for effecting operation of said valve means to exhaust air from the cylinder to allow the by-pass switch to close, locking means actuated by air exhausted from the cylinder for locking the valve means in operated position, and remote manual means for releasing the air pressure in said locking means to effect release of the valve means, whereby the valve means is allowed to return to its initial position to readmit air to the cylinder and reopen the by-pass switch.

9. A series capacitor installation for an alternating-current line comprising a capacitor adapted to be connected in series in said line, a main spark gap device connected across said capacitor and adapted to break down and become conducting whenever the instantaneous voltage across the capacitor exceeds a predetermined value, a compressed air tank, means for directing a blast of air from said air tank through said main gap device as soon as it has broken down, a by-pass switch connected across the capacitor and main gap device, spring means biasing the by-pass switch to closed position, a pneumatic cylinder connected to the by-pass switch, a main valve for admitting air from the air tank to said cylinder to normally hold the by-pass switch in open position, a pilot valve for controlling the operation of said main valve, electric means responsive to a predetermined abnormal condition for actuating the pilot valve to effect operation of the main valve to exhaust air from the cylinder to allow the by-pass switch to close, locking means actuated by air exhausted from the cylinder for locking the main valve in its operated position, and remote manual means for releasing the air pressure in the locking means to effect release of the main valve, whereby the main valve is allowed to return to its initial position to readmit air to the cylinder and reopen the by-pass switch.

10. A series capacitor installation for an alternating-current line comprising a capacitor adapted to be connected in series in said line, a main spark gap device connected across said capacitor and adapted to break down and become conducting whenever the instantaneous voltage across the capacitor exceeds a predetermined value, a second spark gap device connected in parallel with said main gap device, said second gap device having a higher breakdown voltage than the main gap device, a by-pass switch connected across the capacitor, and means responsive to current flow through the second gap device for effecting closing of said by-pass switch.

11. A series capacitor installation for an alternating-current line comprising a capacitor adapted to be connected in series in said line, a main spark gap device connected across said capacitor and adapted to break down and become conducting whenever the instantaneous voltage across the capacitor exceeds a predetermined value, a second spark gap device connected in parallel with said main gap device, said second gap device having a higher breakdown voltage than the main gap device, a by-pass switch connected across the capacitor, spring means biasing the by-pass switch to closed position, means for applying air pressure to the by-pass switch to normally hold the switch in open position, and means responsive to the flow of current through the second gap device for effecting release of the air pressure to allow the by-pass switch to close.

12. A series capacitor installation for an alternating-current line comprising a capacitor adapted to be connected in series in said line, a main spark gap device connected across said capacitor and adapted to break down and become conducting whenever the instantaneous voltage across the capacitor exceeds a predetermined value, a second spark gap device connected in parallel with said main gap device, a by-pass switch connected across the capacitor, spring means biasing the by-pass switch to closed position, means for applying air pressure to the by-pass switch to normally hold the switch in open position, means responsive to flow of current through the second gap device for effecting release of the air pressure to allow the by-pass switch to close, and remote manual means for effecting reapplication of air pressure to reopen the by-pass switch.

13. A series capacitor installation for an alternating-current line comprising a capacitor adapted to be connected in series in said line, a main spark gap device connected across said capacitor and adapted to break down and become conducting whenever the instantaneous voltage across the capacitor exceeds a predetermined value, a by-pass switch connected across the capacitor and main gap device, spring means biasing the by-pass switch to closed position, means for applying air pressure to the by-pass switch to normally hold the switch in open position, and time-delay means responsive to current flow through the main gap device for effecting release of the air pressure to allow the by-pass switch to close if current continues to flow through the main gap device for more than a predetermined time.

14. A series capacitor installation for an alternating-current line comprising a capacitor adapted to be connected in series in said line, a main spark gap device connected across said capacitor and adapted to break down and become conducting whenever the instantaneous voltage across the capacitor exceeds a predetermined value, a by-pass switch connected across the capacitor and main gap device, spring means biasing the by-pass switch to closed position, means for applying air pressure to the by-pass switch to normally hold the switch in open position, time-delay means responsive to current flow through the main gap device for effecting release of the air pressure to allow the by-pass switch to close if current continues to flow through the main gap device for more than a predetermined time, and remote manual means for effecting reapplication of air pressure to reopen the by-pass switch.

15. A series capacitor installation for an alternating-current line comprising a capacitor adapted to be connected in series in said line, a main spark gap device connected across said capacitor and adapted to break down and become conducting whenever the instantaneous voltage across the capacitor exceeds a predetermined value, a by-pass switch connected across the capacitor and main gap device, and time-delay means responsive to the voltage across the capacitor for effecting closing of the by-pass switch in response to a sustained overvoltage of lower magnitude than the breakdown voltage of the main gap device.

16. A series capacitor installation for an alternating-current line comprising a capacitor adapted to be connected in series in said line, a main spark gap device connected across said capacitor and adapted to break down and become conducting whenever the instantaneous voltage across the capacitor exceeds a predetermined value, a by-pass switch connected across the capacitor and main gap device, spring means biasing the by-pass switch to closed position, means for applying air pressure to the by-pass switch to normally hold the switch in open position, and time-delay means responsive to the voltage across the capacitor for effecting release of the air pressure to allow the by-pass switch to close in response to a sustained overvoltage of lower magnitude than the breakdown voltage of the main gap device.

17. A series capacitor installation for an alternating-current line comprising a capacitor adapted to be connected in series in said line, a main spark gap device connected across said capacitor and adapted to break down and become conducting whenever the instantaneous voltage across the capacitor exceeds a predetermined value, a by-pass switch connected across the capacitor and main gap device, spring means biasing the by-pass switch to closed position, means for applying air pressure to the by-pass switch to normally hold the switch in open position, time-delay means responsive to the voltage across the capacitor for effecting release of the air pressure to allow the by-pass switch to close in response to a sustained overvoltage of lower magnitude than the breakdown voltage of the main gap device, and remote manual means for effecting reapplication of air pressure to reopen the by-pass switch.

18. A series capacitor installation for an alternating-current line comprising a capacitor adapted to be connected in series in said line, a main spark gap device connected across said capacitor and adapted to break down and become conducting whenever the instantaneous voltage across the capacitor exceeds a predetermined value, a second spark gap device connected in parallel with said main gap device, said second gap device having a higher breakdown voltage than the main gap device, a by-pass switch connected across the capacitor, spring means biasing the by-pass switch to closed position, means for applying air pressure to the by-pass switch to normally hold the switch in open position, means responsive to current flow through the second gap device for effecting release of the air pressure to allow the by-pass switch to close, time-delay means responsive to current flow through the main gap device for effecting release of the air pressure to allow the by-pass switch to close if current continues to flow through the main gap device for more than a predetermined time, and time-delay means responsive to the voltage across the capacitor for effecting release of the air pressure to allow the by-pass switch to close in response to a sustained overvoltage of lower magnitude than the breakdown voltage of the main gap device.

19. A series capacitor installation for an alternating-current line comprising a capacitor adapted to be connected in series in said line, a main spark gap device connected across said capacitor and adapted to break down and become conducting whenever the instantaneous voltage across the capacitor exceeds a predetermined value, a second spark gap device connected in parallel with said main gap device, said second gap device having a higher breakdown voltage than the main gap device, a by-pass switch connected across the capacitor, spring means biasing the by-pass switch to closed position, means for applying air pressure to the by-pass switch to normally hold the switch in open position, means responsive to current flow through the second gap device for effecting release of the air pressure to allow the by-pass switch to close, time-delay means responsive to current flow through the main gap device for effecting release of the air pressure to allow the by-pass switch to close if current continues to flow through the main gap device for more than a predetermined time, time-delay means responsive to the voltage across the capacitor for effecting release of the air pressure to allow the by-pass switch to close in response to a sustained overvoltage of lower magnitude than the breakdown voltage of the main gap device, and remote manual means for effecting reapplication of air pressure to reopen the by-pass switch.

20. A series capacitor installation for an alternating-current line comprising a capacitor adapted to be connected in series in said line, a main spark gap device connected across said capacitor and adapted to break down and become conducting whenever the instantaneous voltage across the capacitor exceeds a predetermined value, a compressed air tank, means for directing a blast of air from said air tank through the main gap device as soon as it has broken down, a second spark gap device connected in parallel with said main gap device, said second gap device having a higher breakdown voltage than the main gap device, a by-pass switch connected across the capacitor, spring means biasing the by-pass switch to closed position, valve means for applying air pressure from said air tank to the by-pass switch to normally hold the switch in open position, means responsive to current flow through the second gap device for effecting actuation of the valve means to release the air pressure to allow the by-pass switch to close, time-delay means responsive to current flow through the main gap device to effect actuation of the valve means to release the air pressure to allow the by-pass switch to close if current continues to flow through the main gap device for more than a predetermined time, and time-delay means responsive to the voltage across the capacitor for effecting actuation of the valve means to release the air pressure to allow the by-pass switch to close in response to a sustained overvoltage of lower magnitude than the breakdown voltage of the main gap device.

21. A series capacitor installation for an alternating-current line comprising a capacitor adapted to be connected in series in said line, a main spark gap device connected across said capacitor and adapted to break down and become conducting whenever the instantaneous voltage across the capacitor exceeds a predetermined value, a compressed air tank, means for directing a blast of air from said air tank through the main gap device as soon as it has broken down, a second spark gap device connected in parallel with said main gap device, said second gap device having a higher breakdown voltage than the main gap device, a by-pass switch connected across the capacitor, spring means biasing the by-pass switch to closed position, valve means for applying air pressure from said air tank to the by-pass switch to normally hold the switch in open position, means responsive to current flow through the second gap device for effecting actuation of the valve means to release the air pressure to allow the by-pass switch to close, time-delay means responsive to current flow through the main gap device to effect actuation of the valve means to release the air pressure to allow the by-pass switch to close if current continues to flow through the main gap device for more than a predetermined time, time-delay means responsive to the voltage across the capacitor for effecting actuation of the valve means to release the air pressure to allow the by-pass switch to close in response to a sustained overvoltage of lower magnitude than the breakdown voltage of the main gap device, locking means actuated by air released from the valve means for locking the valve means in its actuated position, and remote manual means for exhausting the air from the locking means to effect release of the valve means, whereby the valve means returns to its initial position to reapply air pressure to the by-pass switch and reopen the by-pass switch.

22. A series capacitor installation for an alternating-current line comprising a plurality of capacitor units connected in a bank and adapted to be connected in series in the line, said bank being divided into two similar parallel branches, a main spark gap device connected across the capacitor bank and adapted to break down and become conducting whenever the instantaneous voltage across the bank exceeds a predetermined value, a compressed air tank, means for directing a blast of air from said tank through said main gap device as soon as it has broken down, a remote pressure-responsive switch, means responsive to unbalance of the currents in the two parallel branches of the capacitor bank for admitting air from the air tank to said pressure-responsive switch, and signal means energized by actuation of the pressure-responsive switch.

23. A series capacitor installation for an alternating-current line comprising a plurality of capacitor units connected in a bank and adapted to be connected in series in the line, said bank being divided into two similar parallel branches, a main spark gap device connected across the capacitor bank and adapted to break down and become conducting whenever the instantaneous voltage across the bank exceeds a predetermined value, a compressed air tank, means for directing a blast of air from said tank through said main gap device as soon as it has broken down, a by-pass switch connected across the capacitor bank, spring means biasing the by-pass switch to closed position, means for applying air pressure from the air tank to the by-pass switch to normally hold the switch in open position, means responsive to a predetermined abnormal condition for releasing the air pressure to allow the by-pass switch to close, a remote pressure-responsive switch, means responsive to unbalance of the currents in the two parallel branches of the capacitor bank for admitting air from the air tank to said pressure-responsive switch, and signal means energized by actuation of the pressure-responsive switch.

24. A series capacitor installation for an alternating-current line comprising a capacitor adapted to be connected in series in said line, a main spark gap device connected across said capacitor and adapted to break down and become conducting whenever the instantaneous voltage across the capacitor exceeds a predetermined value, a main compressed air tank remote from the main gap device and substantially at ground potential, an auxiliary compressed air tank mounted adjacent the main gap device and insulated from ground, insulating conduit means connecting the main air tank to the auxiliary air tank, means for directing a blast of air from the auxiliary air tank through the main gap device as soon as it has broken down, a by-pass switch connected across the capacitor, spring means biasing the by-pass switch to closed position, valve means for applying air pressure from the auxiliary air tank to the by-pass switch to normally hold the by-pass switch in open position, means for actuating said valve means to release the air pressure to allow the by-pass switch to close upon the occurrence of a predetermined abnormal condition, and remote manual means substantially at ground potential for effecting return of the valve means to its initial position to reapply air pressure and reopen the by-pass switch.

25. A series capacitor installation for an alternating-current line comprising a capacitor adapted to be connected in series in said line, a main spark gap device connected across said capacitor and adapted to break down and become conducting whenever the instantaneous voltage across the capacitor exceeds a predetermined value, a main compressed air tank remote from the main gap device and substantially at ground potential, an auxiliary compressed air tank mounted adjacent the main gap device and insulated from ground, insulating conduit means connecting the main air tank to the auxiliary air tank, means for directing a blast of air from the auxiliary air tank through the main gap device as soon as it has broken down, a second spark gap device connected in parallel with the main gap device, said second gap device having a higher breakdown voltage than the main gap device, a by-pass switch connected across the capacitor, spring means biasing the by-pass switch to closed position, valve means for applying air pressure to the by-pass switch to normally hold the by-pass switch in open position, said valve means having an actuated position in which the air pressure is released to allow the by-pass switch to close, means for effecting operation of the valve means to actuated position in response to current flow through the second gap device, time-delay means for effecting operation of the valve means to actuated position if current continues to flow through the main gap device for more than a predetermined time, time-delay means for effecting operation of the valve means to actuated position in response to a sustained overvoltage across the capacitor of lower magnitude than the breakdown voltage of the main gap device, locking means actuated by air exhausted from the by-pass switch for locking the valve means in its actuated position, and remote manual means substantially at ground potential for effecting release of the valve means to return it to its initial position to reapply air pressure and reopen the by-pass switch.

26. A series capacitor installation for an alternating-current line comprising a plurality of capacitor units connected in a bank and adapted to be connected in series in the line, said bank being divided into two similar parallel branches, a main spark gap device connected across the capacitor bank and adapted to break down and become conducting whenever the instantaneous voltage across the bank exceeds a predetermined value, a main compressed air tank remote from the main gap device and substantially at ground potential, an auxiliary compressed air tank mounted adjacent the main gap device and insulated from ground, insulating conduit means connecting the main air tank to the auxiliary air tank, means for directing a blast of air from the auxiliary air tank through the main gap device as soon as it has broken down, a by-pass switch connected across the capacitor, spring means biasing the by-pass switch to closed position, valve means for applying air pressure from the auxiliary air tank to the by-pass switch to normally hold the by-pass switch in open position, means for actuating said valve means to release the air pressure to allow the by-pass switch to close upon the occurrence of a predetermined abnormal condition, remote manual means substantially at ground potential for effecting return of the valve means to its initial position to reapply air pressure and reopen the by-pass switch, a remote pressure-responsive switch substantially at ground potential, insulating conduit means connecting the pressure-responsive switch to the auxiliary air tank, means responsive to unbalance of the currents in the two parallel branches of the capacitor bank for admitting air from the auxiliary air tank to the pressure-responsive switch, and signal means energized by actuation of the pressure-responsive switch.

27. A series capacitor installation for an alternating-current line comprising a plurality of capacitor units connected in a bank and adapted to be connected in series in the line, said bank being divided into two similar parallel branches, a main spark gap device connected across the capacitor bank and adapted to break down and become conducting whenever the instantaneous voltage across the bank exceeds a predetermined value, a main compressed air tank remote from the main gap device and substantially at ground potential, an auxiliary compressed air tank mounted adjacent the main gap device and insulated from ground, insulating conduit means connecting the main air tank to the auxiliary air tank, means for directing a blast of air from the auxiliary air tank through the main gap device as soon as it has broken down, a second spark gap device connected in parallel with the main gap device, said second gap device having a higher breakdown voltage than the main gap device, a by-pass switch connected across the capacitor, spring means biasing the by-pass switch to closed position, valve means for applying air pressure to the by-pass switch to normally hold the by-pass switch in open position, said valve means having an actuated position in which the air pressure is released to allow the by-pass switch to close, means for effecting operation of the valve means to actuated position in response to current flow through the second gap device, time-delay means for effecting operation of the valve means to actuated position if current continues to flow through the main gap device for more than a predetermined time, time-delay means for effecting operation of the valve means to actuated position in response to a sustained overvoltage across the capacitor of lower magnitude than the breakdown voltage of the main gap device, locking means actuated by air exhausted from the by-pass switch for locking the valve means in its actuated position, remote manual means substantially at ground potential for effecting release of the valve means to return it to its initial position to reapply air pressure and reopen the by-pass switch, a remote pressure-responsive switch substantially at ground potential, insulating conduit means connecting the pressure-responsive switch to the auxiliary air tank, means responsive to unbalance of the currents in the two parallel branches of the capacitor bank for admitting air from the auxiliary air tank to the pressure-responsive switch, and signal means energized by actuation of the pressure-responsive switch.

RALPH E. MARBURY.

REFERENCES CITED

The following references are of record in the file of this patent:

UNITED STATES PATENTS

| Number | Name | Date |
| --- | --- | --- |
| 2,255,496 | Wyman | Sept. 9, 1941 |
| 2,351,986 | Ludwig et al. | June 20, 1944 |
| 2,351,989 | Marbury | June 20, 1944 |
| 2,447,658 | Marbury et al. | Aug. 24, 1948 |
| 2,453,555 | Thommen | Nov. 8, 1948 |
| 2,495,156 | Baker | Jan. 17, 1950 |